United States Patent
Hooke et al.

[11] Patent Number: 5,834,134
[45] Date of Patent: Nov. 10, 1998

[54] SEALANT GASKETING PLASTIC NUT BATTERY TERMINAL SEAL

[75] Inventors: John Willard Hooke; Mary Jo Frances Elwing, both of Warrensburg, Mo.

[73] Assignee: Hawker Energy Products, Inc., Warrensburg, Mo.

[21] Appl. No.: 652,804

[22] Filed: May 23, 1996

Related U.S. Application Data

[63] Continuation-in-part of Ser. No. 544,813, Oct. 18, 1995, Pat. No. 5,663,015.

[51] Int. Cl.⁶ ............................................. H01M 2/30
[52] U.S. Cl. ........................... 429/181; 429/184; 429/185
[58] Field of Search ................. 429/182, 184, 429/180, 175, 181

[56] References Cited

U.S. PATENT DOCUMENTS

| | | | |
|---|---|---|---|
| 5,053,296 | 10/1991 | Stocchiero | 429/175 |
| 5,273,845 | 12/1993 | McHenry et al. | 429/180 |
| 5,380,603 | 1/1995 | Hooke | 429/180 |

*Primary Examiner*—M. Nuzzolillo
*Attorney, Agent, or Firm*—Lorusso & Loud

[57] ABSTRACT

A sealed, through partition terminal for an electrochemical cell featuring the use of gasketing material to prevent the spread of electrolyte past the terminal seal assembly is disclosed. An orifice formed in a lid of an electrochemical cell accepts a terminal member that is secured to the lid with a fastener threaded onto the terminal member. A shoulder molded on the bottom face of the lid and adjacent to the orifice prevents axial movement of the terminal member while torquing the fastener. A gap formed between the wall of the orifice and the terminal member is filled with gasketing material that is compressed by torquing the fastener. The compressed gasketing material seals any gaps between the terminal member and lid orifice preventing electrolyte leakage.

41 Claims, 10 Drawing Sheets

SEALANT GASKETING PLASTIC NUT BATTERY TERMINAL SEAL

CROSS REFERENCE TO RELATED APPLICATIONS

This is a continuation-in-part of co-pending U.S. patent application Ser. No. 08/544,813, filed Oct. 18, 1995, now U.S. Pat. No. 5,663,015, which is incorporated herein by reference.

BACKGROUND OF THE INVENTION (1) Field of the Invention

This invention relates to sealed, through partition terminals for electrochemical cells, and more particularly to such terminals for lead-acid batteries.

(2) Description of Related Art

A typical terminal seal design consists of a brass terminal encapsulated in a lead terminal, elastomer coating, gasket, an inner top with an orifice and counterbore to accept the terminal and gasket, a mechanical fastener (push nut) and epoxy (see for example U.S. Pat. No. 5,380,603 to Hooke).

A gasket is strategically placed between the lead terminal which is coated with a protective elastomer and the counter bore of the inner top orifice. The gasket provides an acid tight seal when compressed and held in a compressed state with the combination of the terminal, the inner top and the mechanical fastener. The brass terminal has an outside diameter (O.D.) that provides a locking means with the mechanical fastener and maintenance free connection to the battery for the end user.

The epoxy is applied to encapsulate the mechanical fastener and to provide tamper resistance. The epoxy is color coded to distinguish polarity. Epoxies such as Quadrant Red 2398M resin and Quadrant Black 2399 resin mixed with hardener 2006FC (Quadrant Chemical, McKinney, Tex.) have been successfully used for these purposes.

The elastomer coating such as Chemlok 487 TPE adhesive, (Lord Corporation, Elastomer Products Division, Erie, Pa.), has manufacturing and environmental disadvantages. These materials are typically one-part or two-part polyurethane elastomers, formed from suitable isocyanate and active hydrogen supplying monomers or blocked polymers. Polysilane-containing elastomers, such as polysilane-containing urethane elastomers are typically used as sealing enhancing coatings.

The materials are difficult to dispense due to their required low viscosity and very short working time. The one-part formulas have a very limited shelf life therefore two-part systems are used to extend the same. This change adds to the dispensing and mixing difficulties due to a nonstandard mixing ratio (12:88 parts). A thirty minute cure time is required to allow the solvents used in the elastomer formulas to evaporate. The solvents used as diluents, e.g., Xylene and Toluene, in the elastomer coatings promote attack of various engineering plastic resins and require proper ventilation when used. Accordingly, plastic components that may come in contact with these solvents must be protected from exposure to these solvents during the manufacturing process. (See, for example, U.S. Pat. No. 5,182,178 to Brizendine et al.).

The gasket is compressed axially between the lead and the shoulder of the cover orifice. The forces required to compress the gasket could exceed the tensile strength of the terminal which is somewhat malleable. Thus, using the terminal to compress the gasket which is sandwiched between the terminal and inner lid, could potentially result in terminal deformation. Therefore an external force needs to be applied to the terminal to place the gasket into the desired compressed state until the mechanical fastener is applied. This makes the machinery expensive, difficult to maintain and may result in production inconsistencies.

A related problem is the torsional stress placed on the collector tabs/current collector strap assembly at the point of connection with the terminal. The current collector strap is typically made of lead or lead alloy and connects the terminal to electrode plates that generate electricity in the battery. When the mechanical fastener is torqued onto the terminal, there is a substantial amount of rotational force that is transferred through the terminal to the collector tabs/current strap assembly that is stationary. Standard terminal designs and sizes allow the terminal to rotate freely in a battery top terminal orifice. The terminals are anchored mechanically by connection to the current collector strap and by the combination of the terminal base being pressed against the battery container top by application of a mechanical fastener. Terminal rotation is eliminated when the frictional force generated by torquing the mechanical fastener is greater than the force needed to rotate the terminal. Until that point is reached, the terminal can rotate slightly as the current collector strap/terminal joint is not rigidly fixed. There is also some play in the joint that results from the use of malleable metals used to make the joint components.

Cycles of torquing, loosening and retorquing lead to metal fatigue in the current collector strap/terminal joint which can lead to, in extreme examples, tearing and shearing of the joint. This leads, of course, to battery failure.

Another problem associated with the above-referenced method of creating a terminal seal is the addition of epoxy which is difficult to dispense and mix accurately. Variation in application technique results in the formation of air bubbles, cure rate and time fluctuation and product cleanliness. Use of epoxies also invariably leads to delay in the battery manufacturing process. Because epoxies have cure times of varying lengths and are applied during intermediate steps in the manufacturing process, there is a considerable amount of down time and product flow delay that results. Ultimately, this delay leads to a significant reduction in potential product output with attendant adverse effects on inventory. In short, it is inevitable that product flow requirements will be hindered when epoxies are used. To obtain quicker cure rates, specially formulated epoxies have to be used. However, even quick curing epoxies, one hour epoxies, require some manufacturing down time. Proper curing is essential as the material in its cured state is designed to resist attack from any stray acid.

Summary of the Invention

It is, therefore, an object of the present invention to provide a sealing means that eliminates the need for the elastomer coating which in turn, eliminates the associated problems with elastomer cure time, elastomer component mix, elastomer dispensation and solvent application.

Another object of the present invention is to eliminate the need for the use of auxiliary support to maintain gasket compression prior to the application of a mechanical fastener.

A further object of the present invention is to eliminate or reduce the torsional stress placed on a current collector strap/terminal joint when torquing a mechanical fastener onto a terminal. It is desirable to have a strap/terminal joint that can withstand cycles of torquing, loosening and retorquing so that metals with superior electrical conductivity capability can be used to construct the joint without regard to the selected metal's hardness properties.

A still further object of the present invention is to eliminate the need for epoxy and the associated problems with epoxy application. Epoxy elimination improves product flow and variation by eliminating down time resulting from the epoxy curing period. The need for manufacturing tolerances and quality control for epoxy applications, e.g., monitoring air bubble formation and monitoring uniform application of epoxy on appropriate surfaces, is also rendered unnecessary.

To accomplish these and other objectives, the terminal seal assembly according to the present invention includes an externally threaded brass terminal encapsulated in lead, sealant gasketing material, a lid with an orifice, and a mechanical fastener such as a high modulus plastic nut.

The terminal has a top portion, an enlarged bottom portion, and external threading on the top portion. The terminal can also have at least one protrusion extending radially from the bottom portion. The lid has a bottom surface, top surface, at least one side and a portion that defines a lid orifice. The lid orifice is sized to receive the top portion of the terminal and not the bottom portion. The lid can also have raised portions on its bottom surface that are shaped to conform to and adapted to receive any protrusions extending radially from the base portion of the terminal. The fastener has a top, a bottom, at least one side and a portion that defines a fastener orifice with internal threading axially disposed on the portion defining the fastener orifice to matingly receive the external threading on the terminal. The gasketing material is displaceable upon and disposed between the terminal, the lid and the fastener.

The lid has a first shoulder on the bottom surface of the lid that is disposed radially to the lid orifice and adapted to receive the base portion of the terminal along with any base portion protrusions. The lid can also have a second shoulder on the top surface of the lid that is radially disposed to the lid orifice and sized to receive the fastener.

In another embodiment, the invention can further consist of an elastomeric sealing member having portions defining an elastomeric sealing member orifice sized to receive the top portion of the terminal and to not receive the bottom portion of the terminal. The elastomeric sealing member surrounds the top portion of the terminal and is provided between the bottom portion of the terminal and the bottom surface of the fastener or nut. The gasketing material is displaceable upon and between the elastomeric sealing member, the terminal and the bottom surface of the lid.

In a still further embodiment, the elastomeric sealing member is seated in a counterbore formed on the bottom surface of the lid and provided between the lid orifice and the first shoulder of the lid. The gasketing material is again displaceable upon and between the terminal and the bottom surface of the elastomeric sealing member in this embodiment.

In another embodiment, the elastomeric sealing member is seated in a counterbore formed on the top surface of the lid and provided between the lid orifice and the second shoulder of the lid. The gasketing material is again displaceable upon and between the terminal and the bottom surface of the lid.

The terminal can be made of lead or a copper alloy and lead or other suitable metal alloy. The lid can be made of polyphenylene oxide, ABS, polypropylene, or other suitable engineering grade plastic material. The fastener can be a high modulus plastic nut, molded with polyphenylene oxide or other suitable plastic material, or made of a metal alloy such as a brass or copper alloy. The fastener can define any geometric shape including a flower petal configuration. Further, the fastener can be color coded to designate the polarity of the terminal to which the fastener is attached.

The elastomeric sealing member can be, but is not limited to, an o-ring, a rubber sleeve or a gasket. The gasketing material can be made of, but is not limited to, silicone-based compounds.

The seal is achieved by inserting the brass/lead terminal through the lid orifice from the bottom surface of the lid and aligning the terminal so that any protrusions extending radially from the bottom portion of the terminal fit within portions on the bottom surface of the lid adapted to receive the protrusions, coating the terminal with gasketing material, placing the fastener onto the terminal top portion with the internal and external threading aligned and torquing the fastener onto the terminal to releasably secure the terminal and to compress the gasketing material while in an uncured state and restricting radial and axial travel of the gasketing material with the combination of the terminal, the fastener and the lid.

In another embodiment, the terminal seal can be achieved by following the steps described above along with the additional step of placing an elastomeric sealing member or gasket onto and surrounding the top portion of the terminal after the gasketing material is placed on the terminal and before torquing the fastener onto the terminal.

In a further embodiment, a second application of the gasketing material can be placed on the elastomeric sealing member after placing the elastomeric sealing member onto the terminal. The addition of a second coat of gasketing material provides added assurance that a proper seal will be achieved. However, a second coat of gasketing material does not have to be used to achieve the desired seal. One coat should suffice.

In a still further embodiment, the terminal seal can be achieved by following the steps described hereinbefore along with the additional step of providing a counterbore formed in the bottom surface of the lid that is concentric with, and radially extended from, the lid orifice, and is adapted to receive the elastomeric sealing member-terminal subassembly. In an additional embodiment, a counterbore is formed in the top surface of the lid that is concentric with, and radially extended from, the lid orifice, and is adapted to receive the elastomeric sealing member. These and other objects will become apparent from the description and drawings which follow.

The above and other features of the invention, including various novel details of construction and combinations of parts, will now be more particularly described with reference to the accompanying drawings and pointed out in the claims. It will be understood that the particular terminal seal embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Preferred embodiments of the invention will be illustrated in conjunction with the accompanying drawings in which like numerals designate like parts, and in which.

DESCRIPTION OF THE PREFERRED EMBODIMENTS

Figure 1:
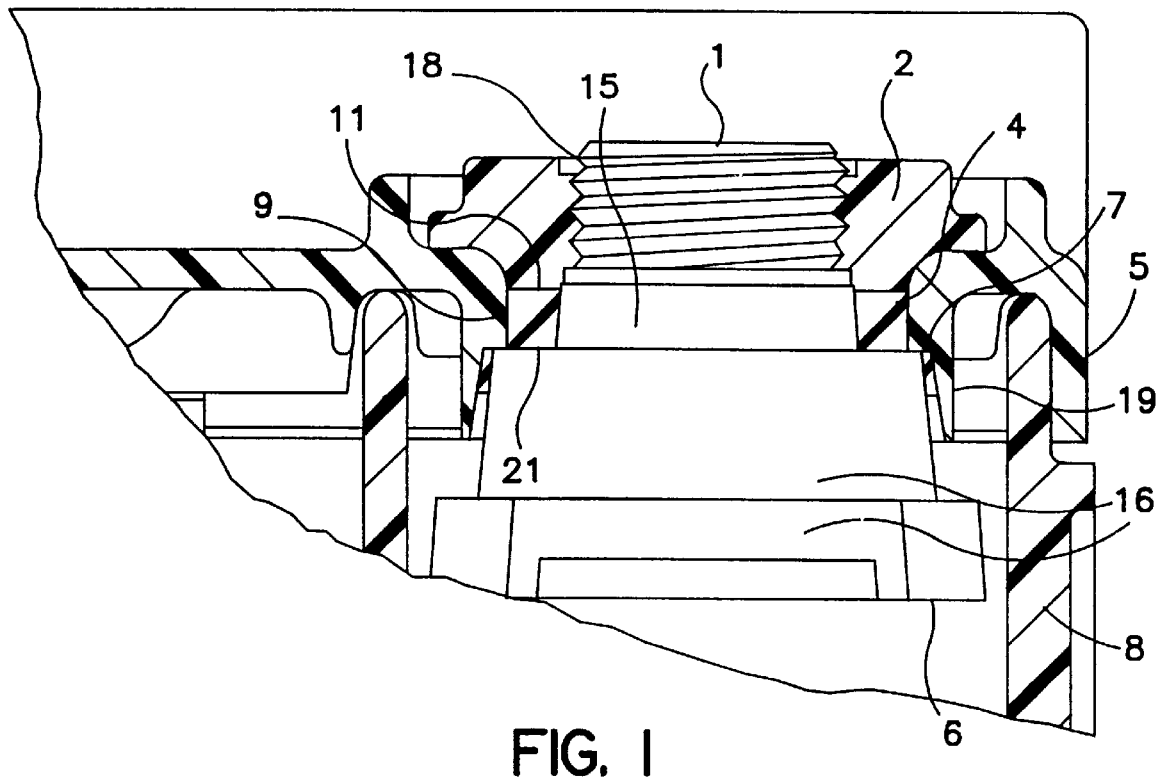
FIG. 1 is an elevational, partial sectional and broken away view of a battery and terminal construction made in accordance with one embodiment of the claimed invention.

Although the invention is broadly applicable to various types of electrochemical cells and batteries, the detailed description will apply to a normally sealed or "valve-regulated" lead-acid battery of the starved electrolyte type, in which gases generated internally namely oxygen are recombined within the battery on charge and overcharge, without significant loss of weight (electrolyte) over its useful life (see U.S. Pat. No. 3,862,861 to McClelland et al.).

Referring to FIGS. 1,2,3, and 4, a terminal insert 1 which is formed of brass, other copper alloy or some other electrically conductive material has external threading 18 to receive an internally threaded fastener 2. Terminal insert 1 preferably is made of a material that has a Rockwell hardness rating of approximately B40 and a tensile strength rating in the 50,000 psi range.

Terminal insert 1 is preferably insert molded in a terminal member 6 which is formed of an electrically conductive material such as lead. Preferably, the terminal member 6 material exhibits good chemical resistance characteristics. Terminal member 6 has a regular geometric shape perimeter which engages a shoulder 7 of a lid 5. However, the perimeter of terminal member 6 can be formed in any shape so long as terminal member 6 is capable of engaging shoulder 7. Axial movement of terminal member 6 is prevented by engagement with shoulder 7 when threaded fastener 2 is torqued.

Figure 5:
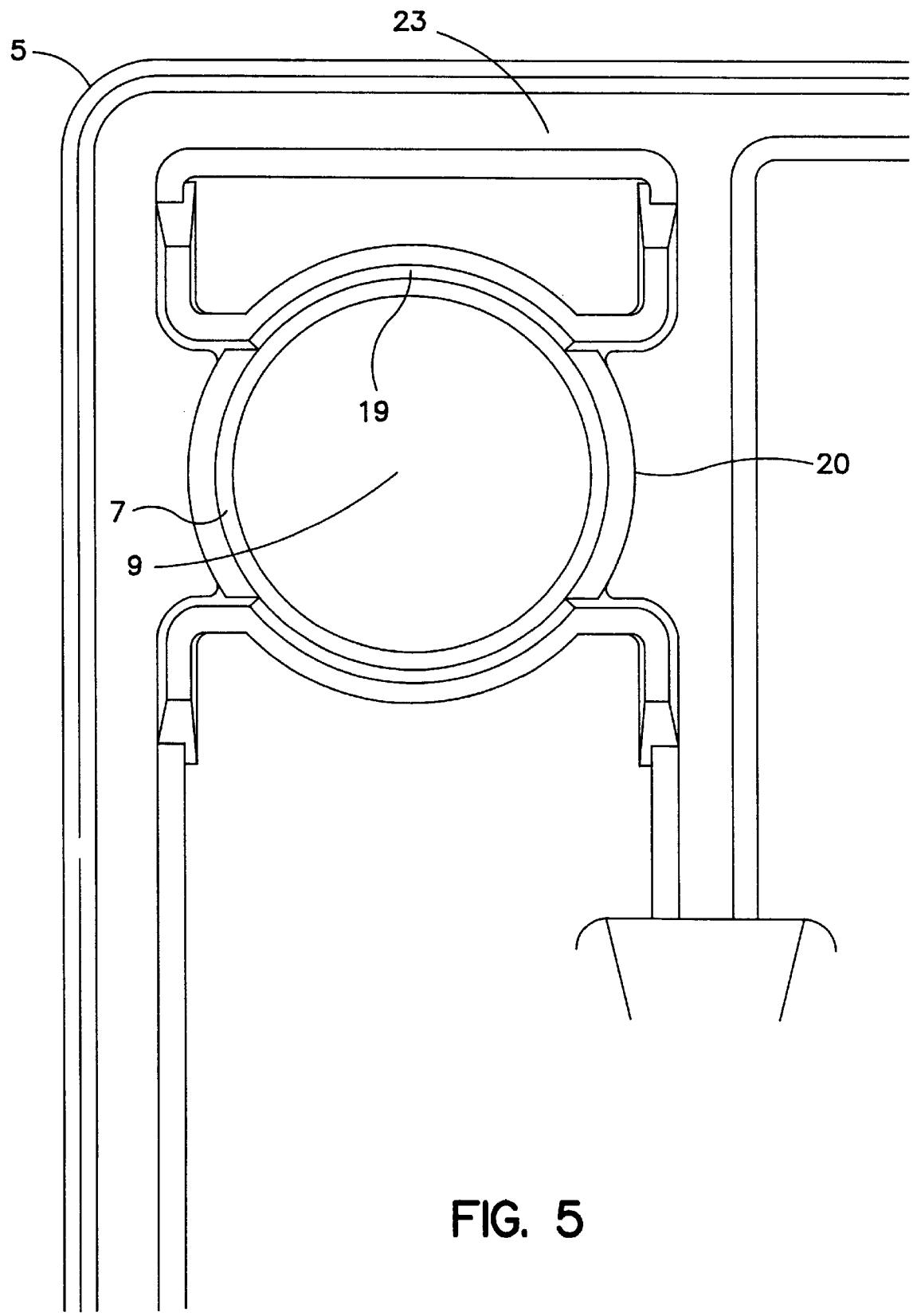
FIG. 5 is a partial plan view a bottom surface of a lid made in accordance with one embodiment of the claimed invention.

Referring to FIG. 5, Lid 5 is preferably formed by injection molding of a suitable engineering grade plastic material which is resistant to battery acids such as sulfuric acid and contains parts such as Bunsen resealable valves (not pertinent to the present invention) and adhesive channels 23. Suitable materials for the lid include NORYL (polyphenylene oxide), ABS, polypropylene, PVC and like materials. Lid 5 is affixed to a container 8 by means of heat sealing, adhesive or other suitable fixation means. For purposes of the present invention, lid 5 can be an inner- or outer-lid of a battery or electrochemical cell.

Terminal member 6 is formed with a top portion 15 and a bottom portion 16. In a preferred embodiment, as shown in FIGS. 6–9, extending from the bottom portion 16 are protrusions 17 which can be formed in any shape.

Lid 5 is designed with an orifice 9 to accept the top portion 15 of terminal member 6. As shown in FIGS. 1–5, a wall 19 projecting from the bottom surface of lid 5 and radially extended from lid orifice 9 is sized to centrally locate a brass-lead terminal comprised of terminal member 6 and terminal insert 1 in lid orifice 9. A top surface 27 of bottom portion 16 is in abutting engagement with shoulder 7.

Figure 10:
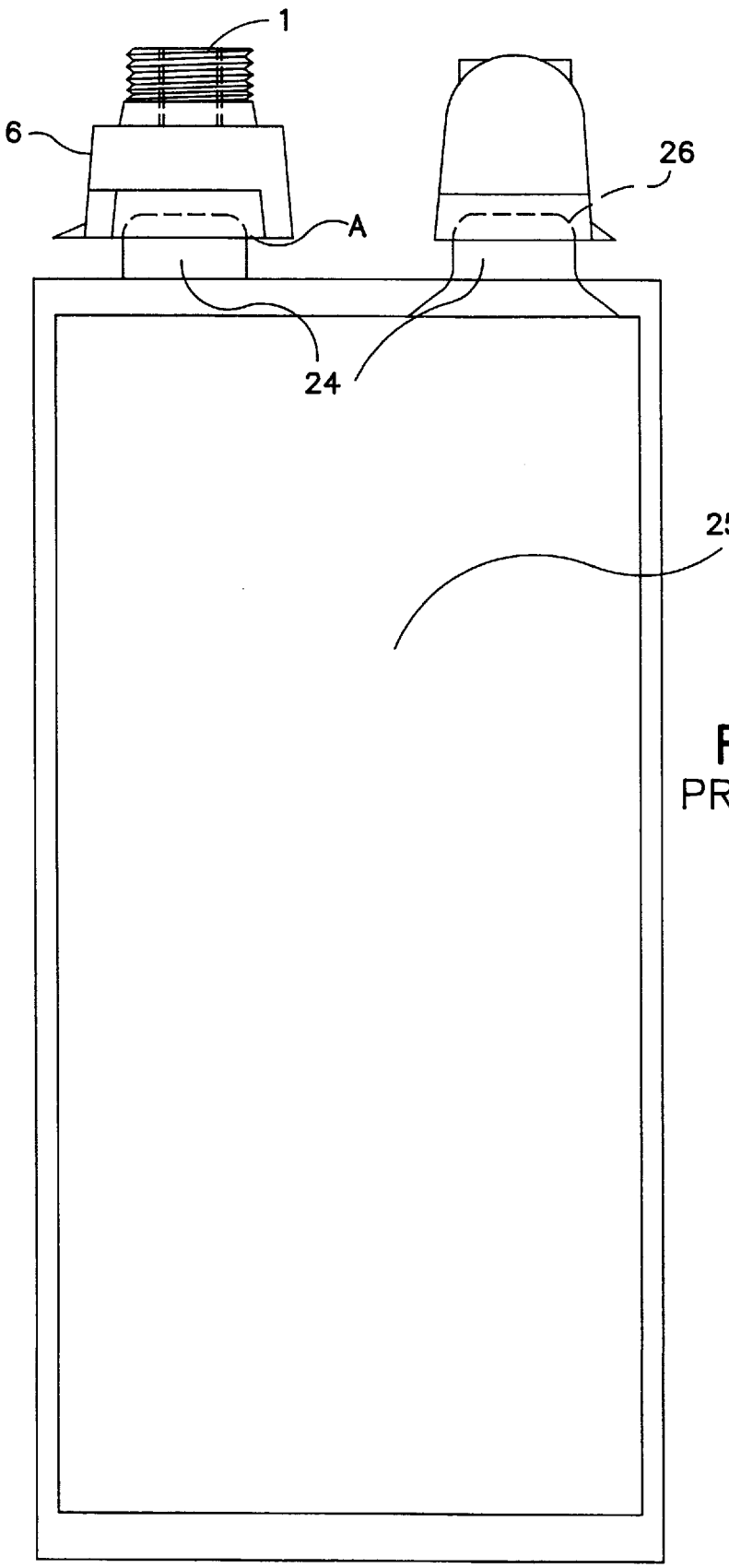
FIG. 10 is an elevational, side view of a prior art terminal/current collector strap joint.
Figure 11:
FIG. 11 is an elevational, front view of a prior art terminal/current collector strap joint.

Referring to FIGS. 10 and 11, it will be seen in a known terminal assembly that a failure point A exists where a collector tabs/current collector strap assembly 26 is joined to terminal member 6. Collector tab 24 is connected to electrode plate 25 and provides electrical connection between electrode plate 25 and terminal member 6. When a mechanical fastener such as nut 2 is torqued onto a terminal comprised of terminal member 6 and terminal insert 1, the torque energy is transferred through the terminal to the current collector strap/terminal joint at point A.

Figure 6:
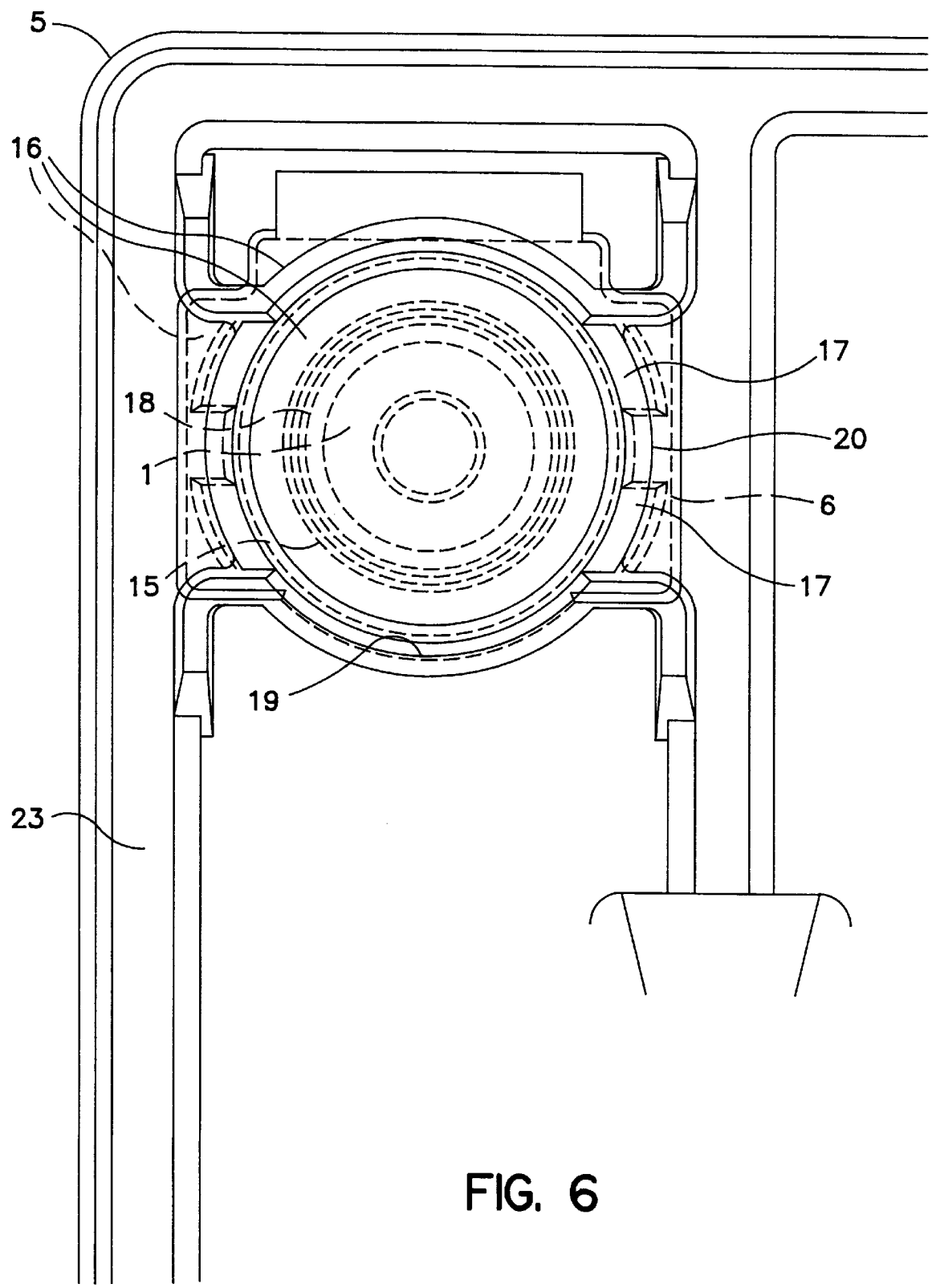
FIG. 6 is a partial plan view of a lid/terminal assembly made in accordance with one embodiment of the claimed invention.
Figure 7:
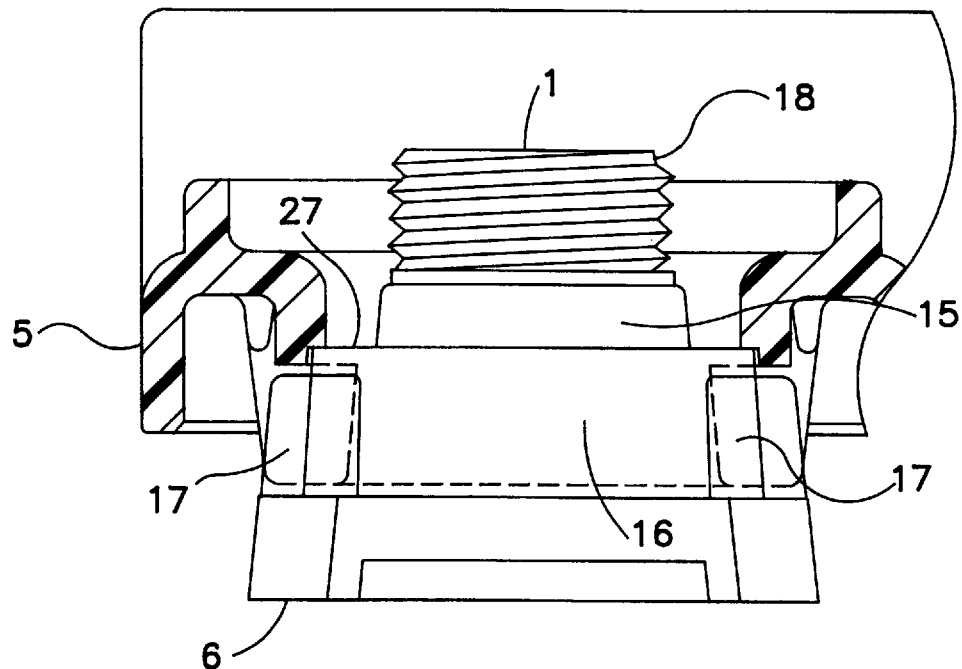
FIG. 7 is an elevational, partial sectional and front view of a lid/terminal assembly made in accordance with one embodiment of the claimed invention
Figure 8:
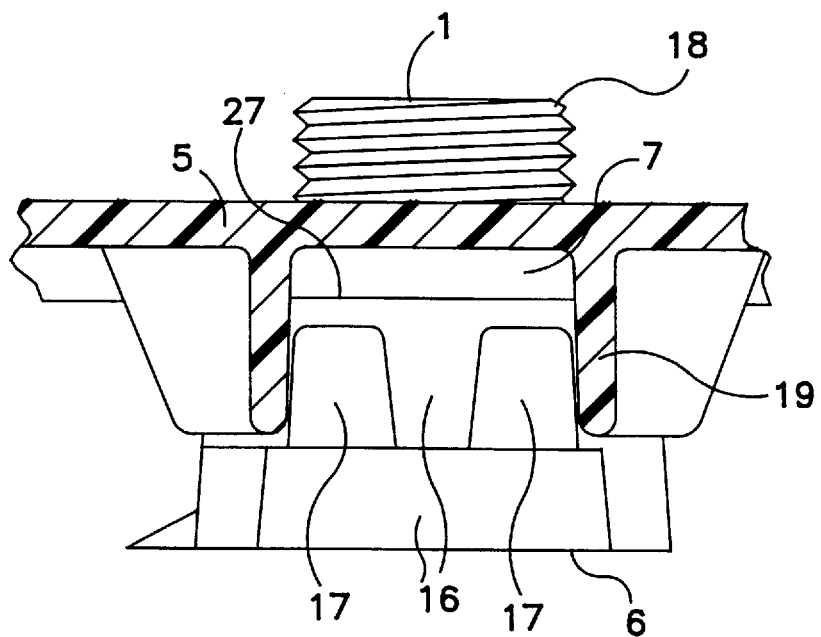
FIG. 8 is an elevational, partial sectional and side view of a lid/terminal assembly made in accordance with one embodiment of the claimed invention.
Figure 9:
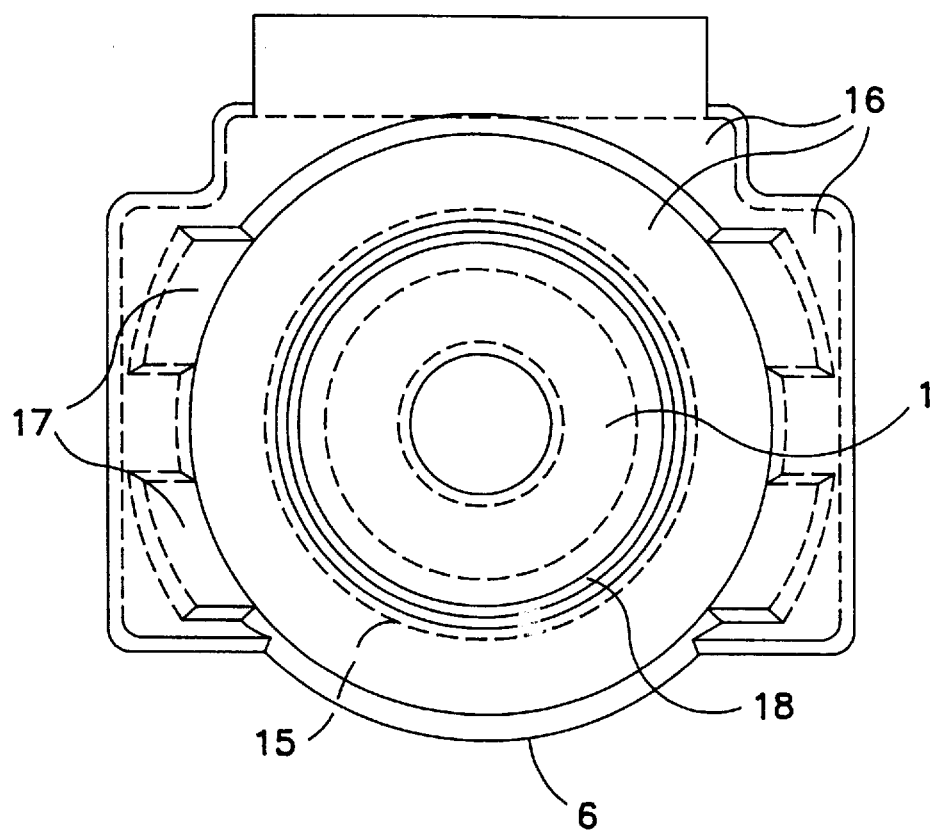
FIG. 9 is a top view of a terminal made in accordance with one embodiment of the claimed invention.

In a preferred embodiment of the present invention, as shown in FIGS. 5 and 6, wall 19 on the bottom surface of lid 5 has recesses 20 adapted to receive the protrusions 17 of the bottom portion of terminal member 6. Extensions 20 are in abutting engagement with protrusions 17, restrict the rotational movement of terminal member 6 when fastener 2 is torqued onto terminal insert 1, and reduce the torsional stress placed on the current collector strap/terminal joint at point A as shown in FIG. 11.

A wall 12 is formed on the top surface of lid 5 and is radially displaced from lid orifice 9 to accept fastener 2 and to provide a tamper proof terminal seal. Tamper proofing is accomplished by minimizing the gap between wall 12 and the outside edge of the fastener 2 so that standard metric and imperial sized tools cannot be used to remove the nut and/or by providing a nonstandard shaped nut that cannot be removed with standard metric or standard imperial sized tools.

Internally threaded fastener 2 is preferably made from a material that can withstand the application of considerable force, i.e., a material that has a high modulus (1,100,000 psi) and excellent high resistance to heat and acid exposure. A fastener in the form of a nut that was evaluated and performed successfully was molded with NORYL SE1GFN3. Polysulfone and filled LEXAN are other suitable materials. The fastener may also be made of metal such as steel or other suitable metal alloy. If a plastic material is used, the fastener can be molded in different colors to distinguish polarity.

Figure 12A:
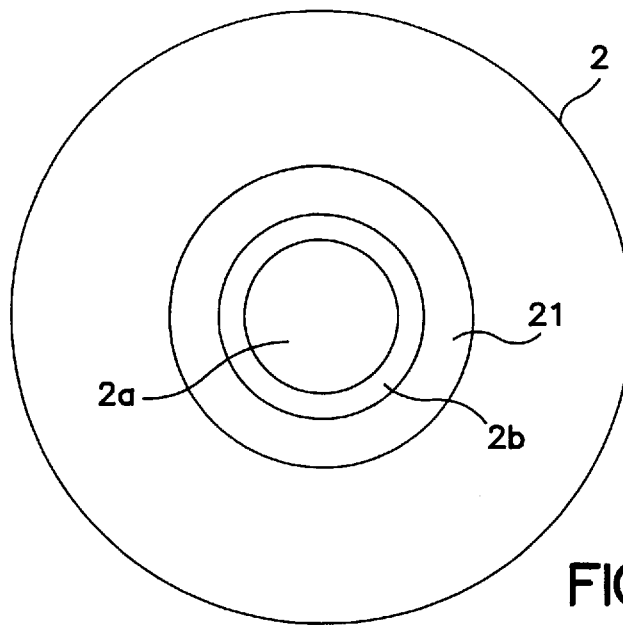
FIG. 12A is a bottom plan view of a mechanical fastener made in accordance with one embodiment of the claimed invention.
Figure 12B:
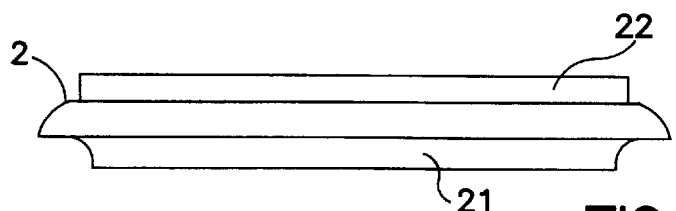
FIG. 12B is a side view of a mechanical fastener made in accordance with one embodiment of the claimed invention.
Figure 12C:
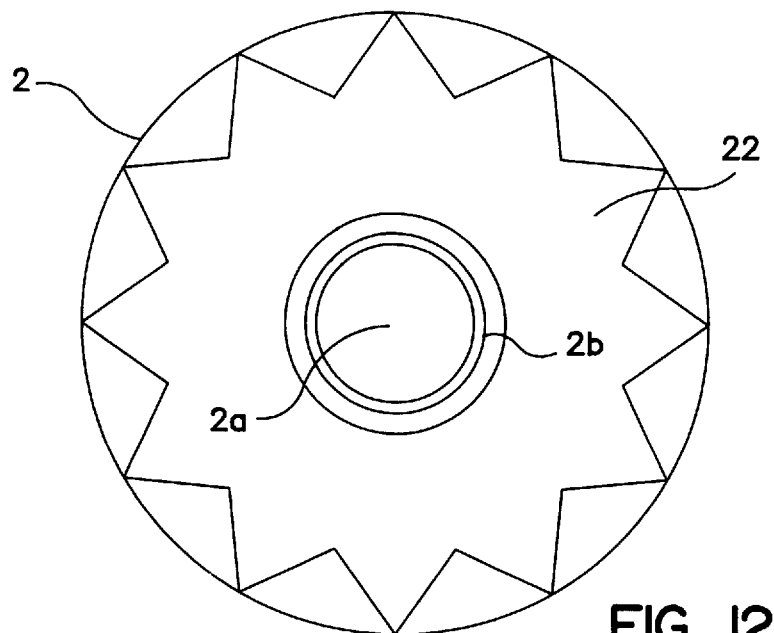
FIG. 12C is a top plan view of a mechanical fastener made in accordance with one embodiment of the claimed invention.

As shown in FIGS. 12A and 12C, fastener 2 has a portion defining a fastener orifice 2a. Nut 2 is designed with internal threading 2b to mate with external threading 18 of terminal insert 1. Internal threading 2b is displaced axially along the portion defining fastener orifice 2a. The perimeter of fastener 2 is molded or shaped into any standard geometric shape or preferably, non-standard irregular shape, to provide a holding means while torquing fastener 2 which acts as a securing and compressing means for a terminal seal assembly of the present invention. Preferably, torque values are in the 10–50 in./lb. range.

Referring to FIGS. 12 A–C, in a preferred embodiment, fastener 2 is formed with an annular protrusion 21 on a bottom surface of fastener 2 that is radially displaced from fastener orifice 2a. The outer diameter of the annular protrusion 21 is slightly smaller than lid orifice 9 so that protrusion 21 can fit into lid orifice 9 when fastener 2 is torqued onto terminal insert 1. Fastener 2 is also formed with a protrusion 22 on a top surface of the fastener 2. Protrusion 22 can be shaped as a standard hex or any nonstandard configuration. A multi-pointed flower-like shape, as depicted in FIG. 12C, has been successfully used.

Figure 12D:
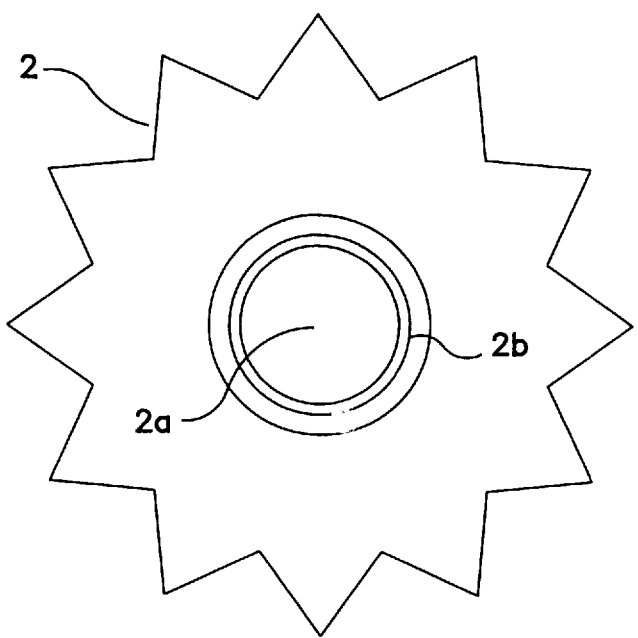
FIG. 12D is a top plan view of a mechanical fastener made in accordance with another embodiment of the claimed invention.

Referring now to FIG. 12D, in the absence of protrusion 22, fastener 2's perimeter can be shaped as a standard hex or any nonstandard configuration. A multi-pointed flower-like shape can also be used. The clearance between fastener 2 and wall 12 is designed to prevent the use of a standard wrench to manipulate fastener 2 and thus enhance tamper resistance.

Because sealant gasketing material 4 has a high viscosity, the material can be put under a slight hydrostatic pressure to force the gasketing material into small cavities and surface imperfections. Tight manufacturing tolerances for terminal surface smoothness and lid edge smoothness is thereby reduced. Any decrease in tolerance requirements can be compensated with the addition of larger amounts of sealant gasketing material. The sealant gasketing material performs the same function as the elastomer coatings, known in the art, for lead protection from acid. Use of the uncured sealant gasketing material reduces the need for precise concentricity between the lid orifice and the lead terminal gasket improving manufacturing assembly.

A sealant gasketing material that has been tested with positive results is the Loctite Ultra Blue Silicone 587 (Loctite Corporation, Rocky Hill, Conn.). Rubber-based compounds that are cured in place with heat and pressure are other possible choices. Loctite Ultra Blue is an industrial/ electronic grade sealant for gasketing applications. The sealant gasketing material also acts as a thread locker which increases the back out torque required to move the plastic nut therefore increasing the tamper resistance.

To assemble the terminal/lid seal assembly, as shown in FIG. 1, terminal member 6 is inserted from the bottom face of lid 5 through orifice 9 molded into lid 5 so that the bottom portion of terminal member 6 engages the shoulder 7 of lid 5. A gap 11 formed between the top portion of terminal member 6 and the edge of orifice 9 is filled with gasketing material 4. While gasketing material 4 is still in an uncured state, fastener 2 is rotated onto terminal 1 and torqued until gasketing material 4 is compressed between the edge of orifice 9, terminal member 6 and the bottom face of fastener 2. Wall 12, molded and formed on lid 5, is sized to accommodate the outer perimeter dimensions of nut 2. Fastener 2 is torqued until contact with lid shoulder 10 which prevents gasketing material 4 from leaking out of gap 11. Preferably, torque values are in the range of 10–50 in./lbs when NORYL Se1GFN3 is the material used for fastener 2. The compressed gasketing material 4 is forced into any irregularities or imperfections in the surface of terminal member 6 and the edge of orifice 9 thereby preventing the leakage or spread of electrolyte past the terminal seal.

Figure 2:
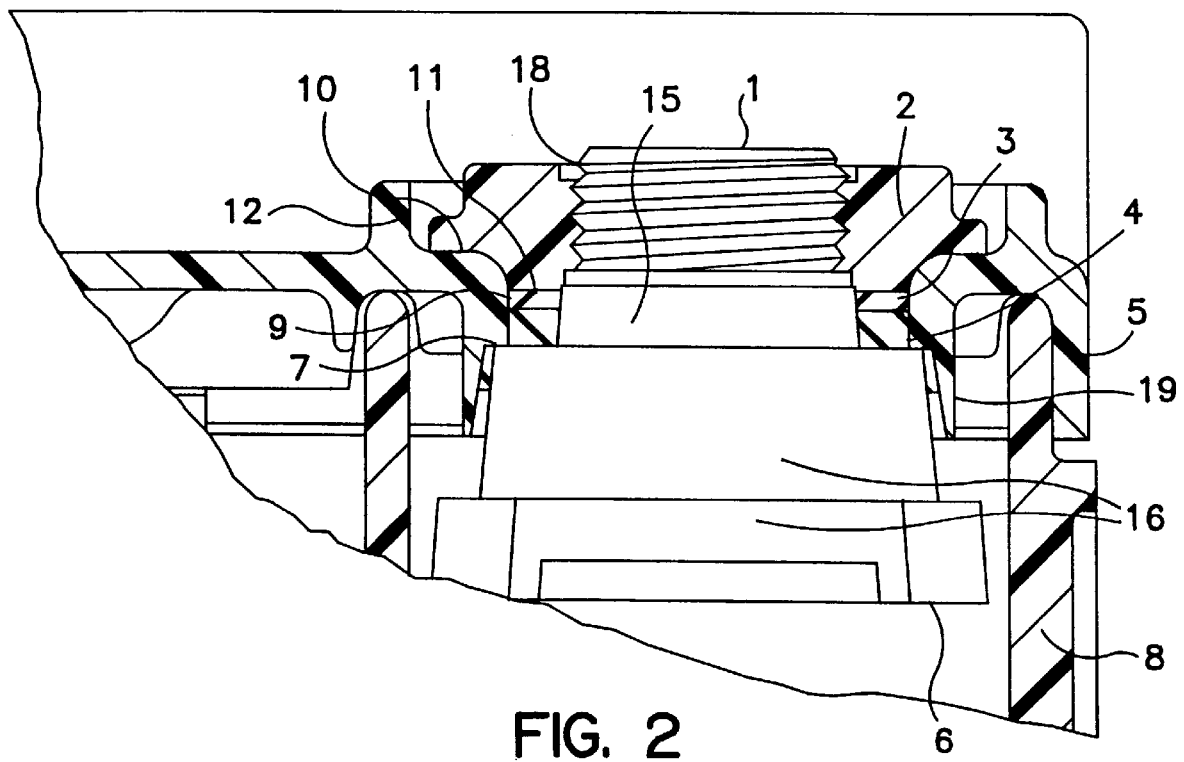
FIG. 2 is an elevational, partial sectional and broken away view of a battery and terminal construction made in accordance with one embodiment of the claimed invention.

In another embodiment, shown in FIG. 2, elastomeric sealing member 3, e.g., an o-ring, is placed around the top portion of terminal member 6 after terminal insert 1 has been inserted into orifice 9 and after gasketing material 4 has been placed in gap 11. After elastomeric sealing member 3 has been placed on terminal member 6, additional gasketing material 4 can be placed onto elastomeric sealing member 3 to ensure that gap 11 and elastomeric sealing member 3 are virtually encapsulated. However, the elastomeric sealing member 3 need not be completely encapsulated to create an effective seal. After the gasketing material has been placed in gap 11 and around the elastomeric sealing member 3, fastener 2 is torqued onto terminal insert 1 until making contact with a shoulder 10. Gasketing material 4 engulfs elastomeric sealing member 3, is forced into the gap formed by the terminal 1/fastener 2 threading interface due to the application of hydrostatic force, and functions as a thread locker.

Figure 3:
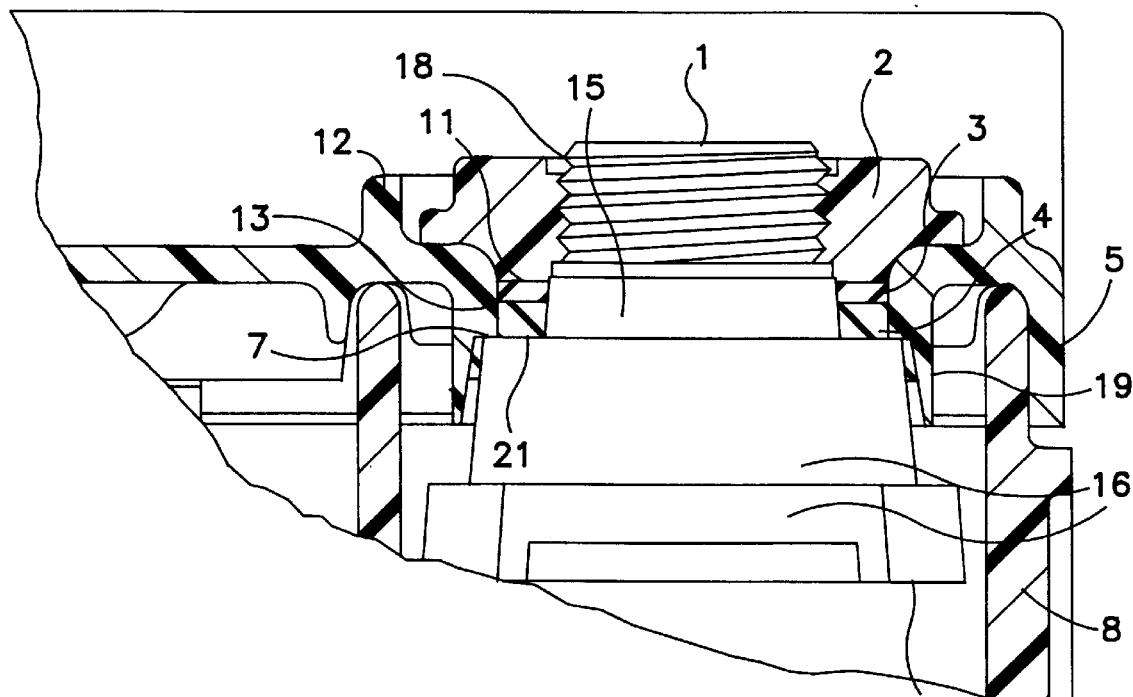
FIG. 3 is an elevational, partial sectional and broken away view of a battery terminal construction made in accordance with one embodiment of the claimed invention.

In a further embodiment, referring to FIG. 3, a recess or counterbore 13 is formed on the underside of lid 5 extending radially from and in concentric relationship with orifice 9. Elastomeric sealing member 3 is sized to fit within counterbore 13. Elastomeric sealing member 3 is placed in the counterbore 13 after the addition of gasketing material 4 to terminal member 6 and before insertion of terminal member 6 into orifice 9. To ensure an effective seal, gasketing material 4 can also be placed on counterbore 13 before placing elastomeric sealing member 3 in the counterbore 13. After terminal member 6 has been inserted into orifice 9, additional gasketing material 4 can be placed in gap 11 to further ensure an effective seal. However, only one application of gasketing material 4 at any point in the assembly process prior to the application of fastener 2 is sufficient to create an effective seal. Finally, fastener 2 is torqued onto terminal 1 until making contact with shoulder 10.

Figure 4:
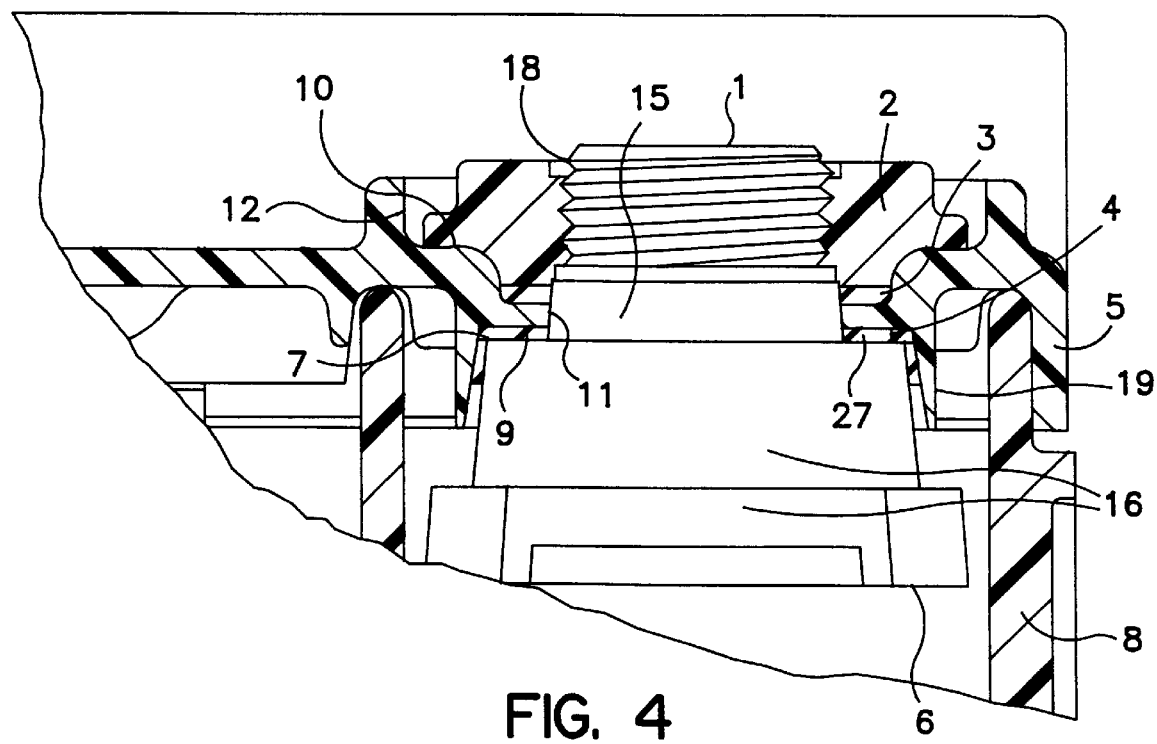
FIG. 4 is an elevational, partial sectional and broken away view of a battery terminal construction made in accordance with one embodiment of the claimed invention.

In a still further embodiment, referring to FIG. 4, a recess or counterbore 14 is formed on the top surface of lid 5 extending radially from, and in concentric relationship with, the orifice 9. Elastomeric sealing member 3 is sized to fit within counterbore 14. Elastomeric sealing member 3 is placed in counterbore 14 after the insertion of terminal member 6 into orifice 9 and after the addition of the gasketing material 4 to gap 11. Additional gasketing material 4 is then coated onto elastomeric sealing member 3 to ensure that gap 11 and elastomeric sealing member 3 are coated by gasketing material 4. After gasketing material 4 has been placed on elastomeric sealing member 3, fastener 2 is torqued onto terminal 1 until making contact with shoulder 10.

In any of the above-referenced embodiments employing an elastomeric sealing member, the gasketing material can be applied in one or two applications. If only one application is used, the gasketing material is coated on the terminal seal assembly before the elastomeric sealing member is placed on the terminal. With a two application embodiment, one coat of gasketing material is placed on the terminal seal assembly before the elastomeric sealing member is placed and a second coat is placed on the elastomeric sealing member and surrounding terminal seal assembly portions after placement of the elastomeric sealing member.

While representative embodiments have been shown for the purpose of illustrating the invention, it will be apparent to one skilled in the relevant art that changes and modifications can be made without departing from the spirit and scope of the invention. For example, the gasketing material can be coated on the terminal before or after insertion into the inner top lid while maintaining the significant advantages of this invention.

Having thus described our invention, what we claim as new and desire to secure by United States Letters Patent is:

1. A terminal seal assembly comprising:
    a terminal member having a top portion and a bottom portion, said top portion of said terminal member having external threading disposed axially on an external surface of said top portion;
    a lid having a portion defining a lid orifice, said lid orifice being sized to receive said top portion of said terminal member and said bottom portion of said terminal member being larger than said lid orifice such that said bottom portion of said terminal member cannot be inserted into said lid orifice;
    a fastener having a portion defining a fastener orifice, said fastener having internal threading axially disposed on said portion of said fastener defining said fastener orifice to matingly receive said external threading of said terminal member; and
    gasketing material being displaceable upon and disposed between said terminal member, said lid and said fastener.

2. The terminal seal assembly of claim 1, wherein said external threading is disposed axially on an external surface of a terminal insert in said top portion of said terminal member.

3. The terminal seal assembly of claim 1, wherein said bottom portion of said terminal member has at least one protrusion extending radially from said bottom portion.

4. The terminal seal assembly of claim 1, wherein said lid has a first shoulder on a bottom surface of said lid, said first shoulder being disposed radially to said lid orifice.

5. The terminal seal assembly of claim 4, wherein said first shoulder of said lid is sized to receive said bottom portion of said terminal member.

6. The terminal seal assembly of claim 1, wherein a first shoulder of said lid is sized to receive said bottom portion of said terminal member and said at least one protrusion extending radially from said bottom portion of said terminal member.

7. The terminal seal assembly of claim 1, wherein said lid has a second shoulder on a top surface of said lid, said second shoulder being disposed radially to the perimeter of said lid orifice.

8. The terminal seal assembly of claim 7, wherein said second shoulder of said lid is sized to receive said fastener.

9. The terminal seal assembly of claim 1, wherein said terminal member is lead.

10. The terminal seal assembly of claim 1, wherein said terminal member is comprised of a copper alloy and lead.

11. The terminal seal assembly of claim 1 further comprising: an elastomeric sealing member having portions defining an elastomeric sealing member orifice, said elastomeric sealing member orifice being sized to receive said top portion of said terminal member and said bottom portion of said terminal member being larger than said lid orifice such that said bottom portion of said terminal member cannot be inserted into said lid.

12. The terminal seal assembly of claim 11 wherein said elastomeric sealing member surrounds said top portion of said terminal member and is provided between said bottom portion of said terminal member and said bottom surface of said lid.

13. The terminal seal assembly of claim 11 wherein said elastomeric sealing member surrounds said top portion of said terminal member and is provided between said top surface of said lid and said bottom surface of said fastener.

14. The terminal seal assembly of claim 11 wherein said gasketing material is displaceable upon and between said terminal member, said lid, said fastener and said elastomeric sealing member.

15. The terminal seal assembly of claim 11 wherein said elastomeric sealing member is seated in a counterbore formed on said bottom surface of said lid and provided between said lid orifice and said first shoulder of said lid.

16. The terminal seal assembly of claim 15 wherein said gasketing material is displaceable upon and between said terminal member, said lid, said fastener and said elastomeric sealing member.

17. The terminal seal assembly of claim 11 wherein said elastomeric sealing member is seated in a counterbore formed on said top surface of said lid and provided between said lid orifice and said second shoulder of said lid.

18. The terminal seal assembly of claim 17 wherein said gasketing material is displaceable upon and between said terminal member, said lid, said fastener and said elastomeric sealing member.

19. The terminal seal assembly of claim 1 wherein said elastomeric sealing member is an o-ring.

20. The terminal seal assembly of claim 1 wherein said elastomeric sealing member is a rubber sleeve.

21. The terminal seal assembly of claim 1 wherein a side of said fastener defines a geometric pattern.

22. The terminal seal assembly of claim 1, wherein said fastener has a first protrusion on a top surface that defines a geometric pattern.

23. The terminal seal assembly of claim 1 wherein said fastener has a second protrusion on a bottom surface of said fastener.

24. The terminal seal assembly of claim 23 wherein said second protrusion has an annular shape.

25. The terminal seal assembly of claim 24 wherein said second protrusion is sized to fit within said lid orifice.

26. The terminal seal assembly of claim 1 wherein said fastener is color coded to designate the polarity of said terminal to which said fastener is attached.

27. The terminal seal assembly of claim 1 wherein said fastener is a high modulus plastic nut.

28. The terminal seal assembly of claim 1 wherein said fastener is molded with polyphenylene oxide.

29. The terminal seal assembly of claim 1 wherein said fastener is a metal alloy.

30. The terminal seal assembly of claim 1 wherein said lid is molded with polyphenylene oxide.

31. The terminal seal assembly of claim 1 wherein said lid is molded with ABS.

32. The terminal seal assembly of claim 1 wherein said lid is molded with polypropylene.

33. The terminal seal assembly of claim 1 wherein said gasketing material is silicone.

34. A method of making a terminal seal assembly comprising:
    providing a terminal member having a top portion, a bottom portion and axially disposed external threading on said top portion;
    providing a lid having a portion defining a lid orifice sized to receive said terminal member;
    inserting said terminal member up and through said lid orifice;
    coating said terminal member and said lid with gasketing material so that a gap formed between said terminal member and said lid is encapsulated by said gasketing material;

placing a fastener having a portion defining a fastener orifice with internal threading axially disposed on said portion defining said fastener orifice sized to matingly receive said terminal member, onto said top portion of said terminal member;

torquing said fastener onto said terminal member to releasably secure said terminal member and to compress said gasketing material while in an uncured state; and restricting radial and axial travel of said gasketing material with the combination of said terminal member, said fastener and said lid.

35. The method of claim 33 further comprising:

providing said external threading on a terminal insert placed in said top portion of said terminal member.

36. The method of claim 34 further comprising:

placing an elastomeric sealing member having portions defining an elastomeric sealing member orifice sized to receive said top portion of said terminal member, onto and surrounding said top portion of said terminal member.

37. The method of claim 36 further comprising:

coating said elastomeric sealing member with gasketing material so that said elastomeric sealing member is at least partially covered by said gasketing material.

38. The method of claim 36 further comprising:

forming a counterbore on a top surface of said lid and providing said counterbore radially from, and in concentric relationship with, said lid orifice and sized to receive said elastometic sealing member;

coating said counterbore with said gasketing material;

placing said elastomeric sealing member onto said top portion of said terminal member; and seating said elastomeric sealing member in said counterbore on said top surface of said lid.

39. The method of claim 38 further comprising:

coating said elastomeric sealing member with said gasketing material so that said elastomeric sealing member is at least partially covered by said gasketing material.

40. The method of claim 36 further comprising:

forming a counterbore on said bottom surface of said lid and providing said counterbore radially from, and in concentric relationship with, said lid orifice and sized to receive said elastomeric sealing member;

coating said counterbore with said gasketing material;

placing said elastomeric sealing member onto and surrounding said top portion of said terminal member; and seating said elastomeric sealing member in said counterbore on said bottom surface of said lid.

41. The method of claim 40 further comprising:

coating said elastomeric sealing member with said gasketing material so that said elastomeric sealing member is at least partially covered by said gasketing material.

* * * * *